United States Patent
Bradley

(10) Patent No.: US 8,903,324 B1
(45) Date of Patent: Dec. 2, 2014

(54) PASSIVE INTERMODULATION (PIM) DISTANCE-TO-FAULT ANALYZER AND METHOD TO RESOLVE DISTANCE-TO-FAULT WITHIN A CONSTRAINED RECEIVE BAND

(71) Applicant: Anritsu Company, Morgan Hill, CA (US)

(72) Inventor: Donald Anthony Bradley, Morgan Hill, CA (US)

(73) Assignee: Anritsu Company, Morgan Hill, CA (US)

( * ) Notice: Subject to any disclaimer, the term of this patent is extended or adjusted under 35 U.S.C. 154(b) by 208 days.

(21) Appl. No.: 13/625,634

(22) Filed: Sep. 24, 2012

(51) Int. Cl.
*H04B 17/00* (2006.01)

(52) U.S. Cl.
USPC ........................................................ 455/67.11

(58) Field of Classification Search
None
See application file for complete search history.

(56) References Cited

U.S. PATENT DOCUMENTS

| | | | | |
|---|---|---|---|---|
| 5,602,709 | A * | 2/1997 | Al-Dabbagh | 361/85 |
| 5,994,905 | A * | 11/1999 | Franchville | 324/533 |
| 7,469,190 | B2 * | 12/2008 | Bickel | 702/60 |
| 8,058,880 | B2 | 11/2011 | Bradley | |
| 8,666,322 | B1 * | 3/2014 | Bradley et al. | 455/67.11 |
| 2003/0232600 | A1 | 12/2003 | Montgomery | |
| 2009/0096466 | A1 | 4/2009 | Delforce | |
| 2009/0125253 | A1 | 5/2009 | Blair | |
| 2010/0085061 | A1 * | 4/2010 | Bradley et al. | 324/520 |
| 2010/0164504 | A1 * | 7/2010 | Bradley | 324/520 |
| 2010/0295533 | A1 | 11/2010 | Kuga | |

FOREIGN PATENT DOCUMENTS

| | | |
|---|---|---|
| WO | 03030416 | 4/2003 |
| WO | 2012009757 | 1/2012 |

OTHER PUBLICATIONS

Bell, et al., Range to Fault Technology, Kaelus, 2011, pp. 1-10. Retrieved on Aug. 4, 2014 from: http://www.precision-marketing.com/wp-content/uploads/RTF-white-paper.pdf.

* cited by examiner

*Primary Examiner* — Nay A Maung
*Assistant Examiner* — Alejandro Rivero
(74) *Attorney, Agent, or Firm* — Meyer IP Law Group

(57) ABSTRACT

An embodiment of a method in accordance with the present invention for determining a distance to a source of passive intermodulation (PIM) in a radio frequency (RF) transmit/receive system comprises a two step process. As a first step, a first and second signal with frequencies in a transmit band are generated at a first power and a third order harmonic signal generated by a source of PIM within the system is obtained in the receive band. If the magnitude of the PIM exceeds a noise threshold, a second step is performed. The second step includes generating a third and fourth signal at a second power higher than the first power to obtain a higher order harmonic signal generated by the source of PIM. The PIM magnitude and a distance to the source of the PIM are calculated using the higher order harmonic signal.

14 Claims, 3 Drawing Sheets

PASSIVE INTERMODULATION (PIM) DISTANCE-TO-FAULT ANALYZER AND METHOD TO RESOLVE DISTANCE-TO-FAULT WITHIN A CONSTRAINED RECEIVE BAND

TECHNICAL FIELD

The present invention relates to measuring passive intermodulation (PIM) in a wireless communication system and identifying a location of a source of measured PIM.

BACKGROUND

Passive Inter-Modulation (PIM) refers to a series of unwanted (but related) frequencies called harmonics created when two or more frequencies pass through a nonlinear device or junction. PIM can occur in components of wireless communication systems normally thought of as linear, such as cables, connectors, and antennas, but which are installed improperly or degraded in quality. Such nonlinear components can generate spurious signals when subject to the high radio frequency (RF) powers found in cellular networks. When two or more transmit frequencies, for example transmitted by a base transceiver station (BTS) of a cellular network, pass through the nonlinear component, the transmit frequencies are mixed and create PIM.

For carriers and the BTS, PIM represents noise or interference. The noise level (or noise floor) largely determines BTS receiver performance. Lower PIM levels result in better, more efficient BTS operation. For cellular network users, PIM can result in a rise in audible noise, dropped calls, reduced signal area, early handoff, and other problems. When a problem is detected at a BTS, a tower crew is dispatched to the site to measure for PIM. Standard PIM measurements only provide PIM magnitude. Typically a PIM measurement is provided to the tower crew as a pass/fail result where a fail result indicates a source of unacceptably large PIM. Upon obtaining a fail result, and relying only on the pass/fail result, the tower crew often has to dismantle an installation to identify the PIM source. If the PIM source is located beyond the antenna, for example where an unrelated antenna re-radiates signals received from and transmitted by the antenna of the BTS, the PIM source may not be resolved even by replacing all of the components of an installation.

Distance-to-fault techniques, which are described for example in U.S. Pat. No. 8,058,880 to Bradley et al., titled "CALIBRATED TWO PORT PASSIVE INTERMODULATION (PIM) DISTANCE TO FAULT ANALYZER," incorporated herein by reference, have recently been developed to quickly identify the location of a PIM source, reducing the cost of repair by reducing the number of components that must be inspected and/or dismantled to eliminate the PIM. Distance-to-fault techniques have also made PIM monitoring practical, allowing network operators to monitor PIM over time and address creeping problems before catastrophic failure occurs.

Intermodulation products from continuous wave (CW) signals, such as might be created by a PIM tester, appear as single frequency CW products. However, PIM created from modulated carriers requires more bandwidth than the fundamental signals themselves. As a result, PIM products can be very wide-band, covering wide swaths of frequencies. Problematically, base station receive bands can be very constrained in frequency range, limiting the distance resolution of the distance-to-fault technique. What are needed are systems and methods for improving distance resolution within constrained receive bands.

BRIEF DESCRIPTION OF THE DRAWINGS

Further details of the present invention are explained with the help of the attached drawings in which.

DETAILED DESCRIPTION

The following description is of the best modes presently contemplated for practicing various embodiments of the present invention. The description is not to be taken in a limiting sense but is made merely for the purpose of describing the general principles of the invention. The scope of the invention should be ascertained with reference to the claims. In the description of the invention that follows, like numerals or reference designators will be used to refer to like parts or elements throughout.

It would be apparent to one of skill in the art that the present invention, as described below, may be implemented in many different embodiments of hardware, software, firmware, and/or the entities illustrated in the figures. Any actual software, firmware and/or hardware described herein is not limiting of the present invention. Thus, the operation and behavior of the present invention will be described with the understanding that modifications and variations of the embodiments are possible, given the level of detail presented herein.

Figure 1:
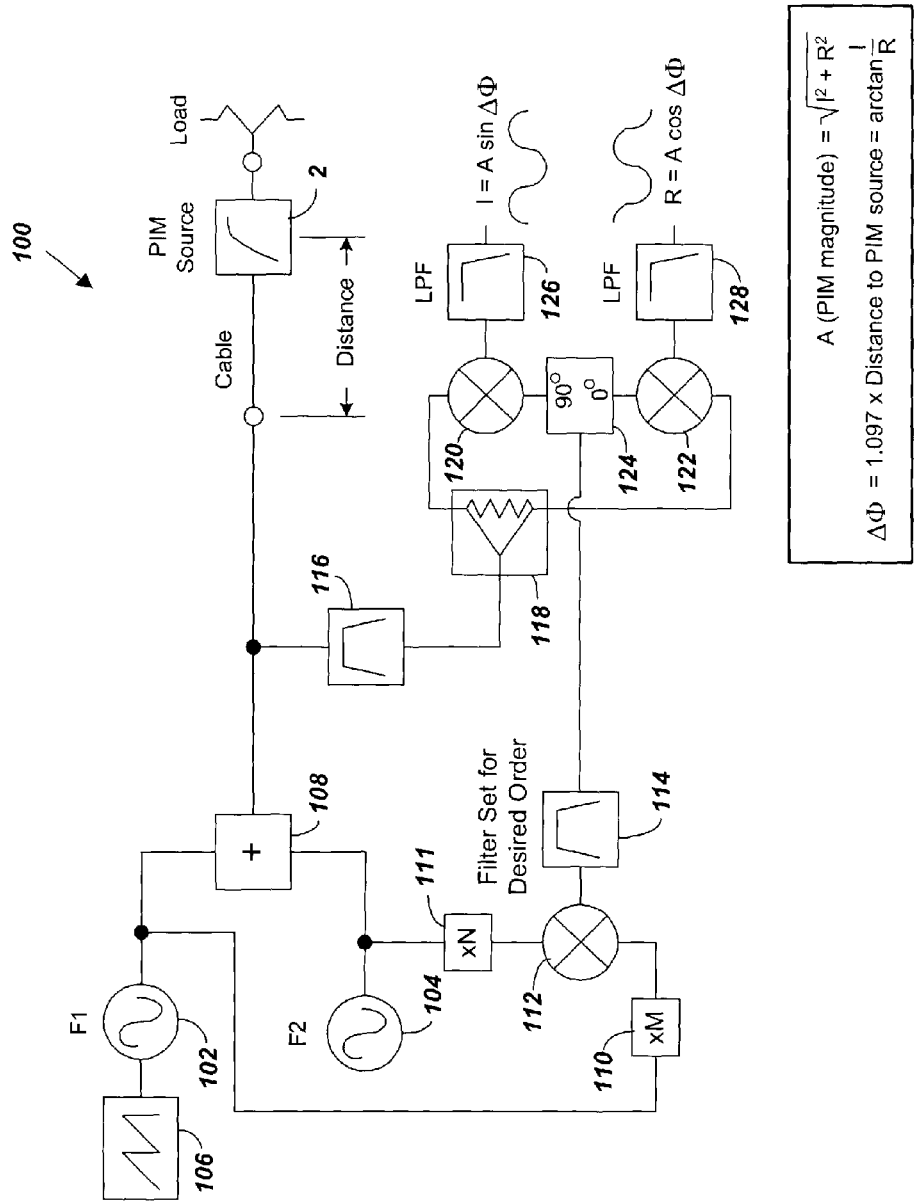
FIG. 1 is a block diagram of an exemplary PIM measurement device for use with embodiments of systems and methods in accordance with the present invention, the PIM measurement system using CW signals and phase shift to determine PIM magnitude and distance to the PIM source.

FIG. 1 is a block diagram of components of an exemplary PIM measurement device 100 for use with embodiments of systems and methods in accordance with the present invention. The PIM measurement device 100 uses continuous wave (CW) signals and a change in phase ($\Delta\Phi$) to determine the distance from a test port P1 to a PIM source 2 within a radio frequency (RF) transmit/receive system (also referred to herein as distance-to-fault). As shown, a sweep generator 106 uses a step frequency to cause a frequency change in a signal F1 generated by a first signal source 102 connected with the sweep generator 106. The frequency modulated (FM) sweep signal F1 is combined with a fixed signal F2 from a second signal source 104 at a combiner 108 to produce additional signals 2*(F1+FM)−F2 and 2*F2−(F1+FM) when modified by the PIM source 2. The reflected PIM signal produces a phase change.

FIG. 1 further includes components to accomplish addition of the sweep generator frequency and down-conversion of an output signal for analysis. To provide a signal source for down-conversion, the circuitry includes an xM frequency multiplier 110 connected to the first signal source 102 and an xN frequency multiplier 111 connected to the second signal source 104. The outputs of the xM frequency multiplier 110 and the xN frequency multiplier are provided to a first input of a mixer 112. The frequency multiplier variables are selected to choose a desired harmonic. For example, an M value of 2 and an N value of 1 will produce a $3^{rd}$ order harmonic, while an M value of 3 and an N value of 2 will produce a $5^{th}$ order harmonic. Examples of harmonics produced based on multiplier selection is discussed, for example, in U.S. Pat. No. 8,058,880 to Bradley et al., entitled "CALIBRATED TWO PORT PASSIVE INTERMODULATION (PMI) DISTANCE TO FAULT ANALYZER" and incorporated herein by reference.

The circuit of FIG. 1 is merely exemplary. In other embodiments of systems and methods in accordance with the present invention, PIM measurement devices can use other circuit arrangements to obtain higher order harmonics. For example, U.S. Pat. No. 8,058,880 to Bradley et al. illustrate and describe alternative circuits' arrangement including a circuit that includes clipping diodes to create harmonic signals. A bandpass filter 114 centered eliminates other mixing products and passes the signal to a linear quadrature detector circuit that allows amplitude and phase measurements of the PIM signal. The linear quadrature circuit includes a phase splitter 124 that receives the signal passed by the bandpass filter 114 as input. The phase splitter 124 includes both 0° and 90° phase-shifted outputs to provide imaginary (I) and real (R) signal components of first inputs to mixers 120 and 122, respectively. A 0° power splitter 118 receives a reflected test signal that is a $3^{rd}$ order harmonic generated by the PIM (also commonly referred to as IM3 in the industry) having a frequency of 1732.5 MHz. The test signal is passed through a bandpass filter 116 to the power splitter 118 and provided by the power splitter 118 as second inputs to the two mixers 120 and 122. The output of the first mixer 120 is passed through a first low pass filter (LPF) 126 to provide the imaginary (I) signal component. The output of the second mixer 122 is passed through a second low pass filter (LPF) 128 to provide the real (R) signal component. The phase shift can be calculated with the imaginary (I) and real (R) signal components using the formula $$\Delta\Phi = \arctan\left(\frac{I}{R}\right)$$

where $\Delta\Phi$ is the phase shift. The distance from the test port P1 to the PIM source can be calculated based on the phase shift using the formula $$D = \frac{\Delta\Phi}{1.097}$$

where D is the distance to the PIM source in feet.

The magnitude of the PIM created by the PIM source can also be calculated using the formula $$A = \sqrt{I^2 + R^2}$$

where A is the magnitude of the PIM.

Figure 2:
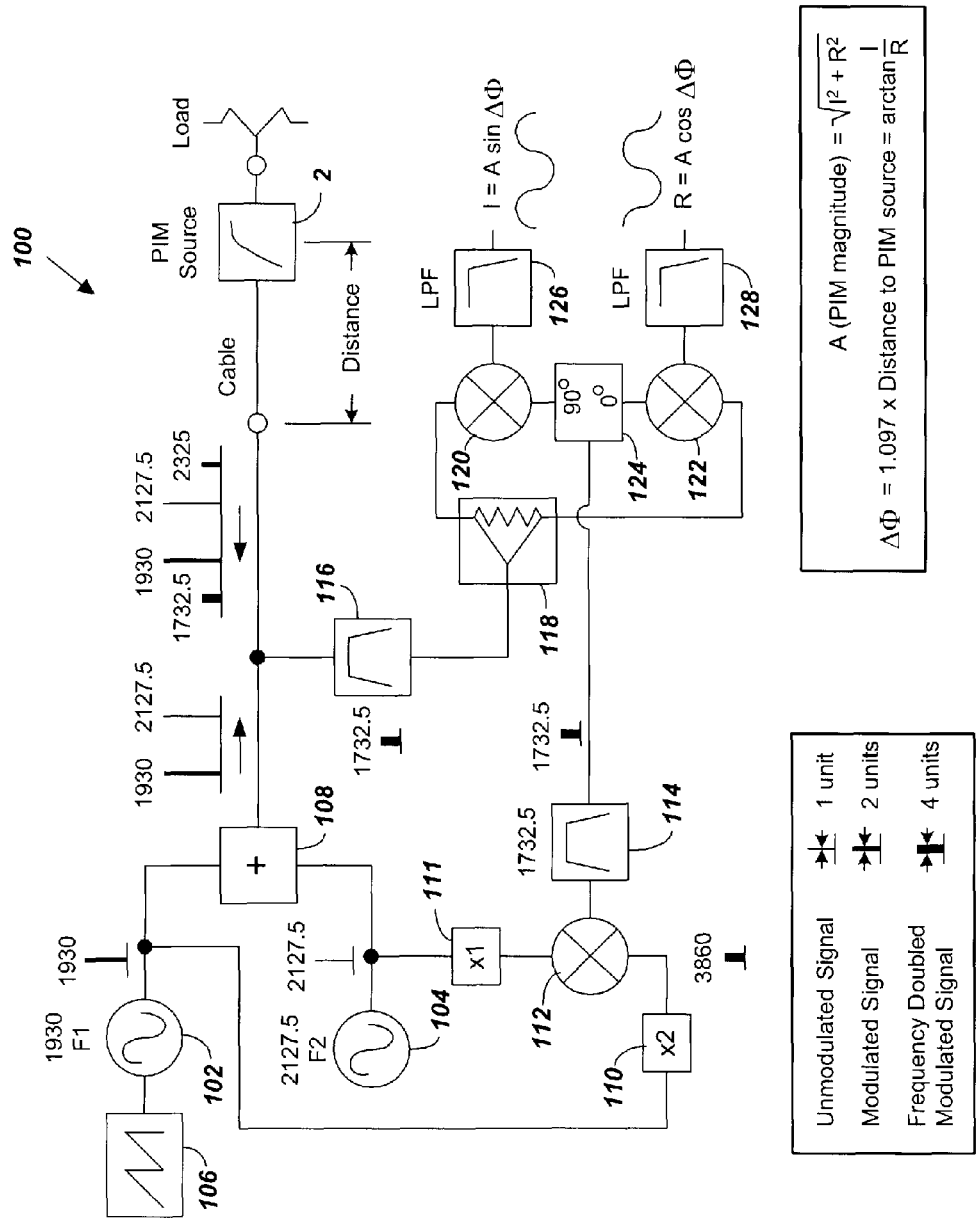
FIG. 2 is a block diagram of the exemplary PIM measurement device for use with embodiments of systems and methods in accordance with the present invention with exemplary signals for measuring third order responses.

FIG. 2 is a block diagram of the components of the exemplary PIM measurement device 100 of FIG. 1 with exemplary signals, for purposes of illustration. As shown, the sweep generator 106 uses a step frequency of 674 KHz over 33.4 steps to cause a +/−11.25 MHz frequency change in the signal F1 having a frequency of 1930 MHz generated by the first signal source 102. The sweep generator 106 is shown creating a 1.4844 µs period sawtooth wave. The frequency modulated (FM) sweep signal F1 is combined with a fixed signal F2 having a frequency of 2127.5 MHz generated by the second signal source 104 at a combiner 108 to produce additional signals 2*(F1+FM)−F2 and 2*F2−(F1+FM) when modified by the PIM source 2. The reflected PIM signal produces a phase change.

As shown, an ×2 frequency multiplier 110 is connected to the first signal source 102 to provide an output having a frequency of 3860 MHz with a sweep of +/−22.5 MHz. The output of the ×2 frequency multiplier 110 is provided to the first input of the mixer 112. A ×1 frequency multiplier 111 is connected to the second signal source to provide an output of 2127.5 MHz. The output of the ×1 frequency multiplier 111 is likewise provided to the first input of the mixer 112. The output of the mixer 112 includes $3^{rd}$ order harmonic with a frequency of 1732.5 MHz (3860 MHz−2127.5 MHz=1732.5 MHz). A bandpass filter 114 centered at 1732.5 MHz eliminates other mixing products and passes the 1732.5 MHz signal to the linear quadrature detector circuit that allows amplitude and phase measurements of the PIM signal.

Exemplary signal frequencies are shown in FIG. 1 to illustrate operation of the circuitry and are not intended to limit the operation frequencies that can be used with the circuitry. Further in FIG. 1, included with the specific frequency number is a signal type indicator. As shown, a one unit thickness indicator represents a non-modulated signal, a two unit thickness indicator represents a modulated signal, and a four unit thickness indicator indicates a signal that is both modulated and doubled in frequency.

Distance resolution in a distance-to-fault measurement is dependent on how well test signals generated by a PIM source (e.g., the $3^{rd}$ order harmonic) can be characterized during signal analysis. A fast Fourier transform (FFT) analysis of a signal improves with increasing information about the signal. The more cycles of a signal that are captured, the more information obtainable about the signal and the better the integration representing a sine wave of the signal. PIM measurement includes observing pieces of sine waves and determining a period of the observed sine waves for conversion into a distance measurement. However, the sine waves of the PIM signals are not propagating at the frequency of measurement, but rather are beats caused by the interaction of the test signals along the line. The beats are measured by the PIM measurement device. The more beats obtained, the better the distance resolution. The number of beats obtainable increases with bandwidth. Thus distance resolution can be said to be generally bandwidth dependent.

It has been observed that distance resolution in a distance-to-fault measurement is inversely proportional to measurement bandwidth by the relationship $$R = \frac{c * V_p}{2 * \Delta F}$$

where R is resolution in feet, c is the speed of light constant, and $V_p$ is the velocity of propagation of the signal through a specific medium. A typical cable run to an antenna can range in distance, for example, from 30 to 200 feet. For such an installation, a distance resolution often feet is considered a reasonable resolution for determining the location of a fault. A ten foot distance resolution requires approximately 44 MHz of measurement bandwidth (i.e., $\Delta F$=44 MHz).

An industry standard technique using two test tones at 20 Watts per tone is typically employed when a site is PIM tested. The two test tones are used to generate a known PIM signal of a $3^{rd}$ order harmonic (called IM3, as noted above) which is used to determine PIM problems in a cable run up to and past an antenna. The two test tones are chosen from within a transmit band by targeting test tones that are calculated to produce harmonics that will fall within a receive band. A PIM test set (i.e., PIM measurement device) used by a technician to perform the PIM test is tuned to measure IM3. The lower the PIM level detected, the higher the component and installation quality. When the PIM level detected exceeds a threshold, a "fail" result is returned and the technician is typically tasked to locate one or more PIM sources responsible for the fail result. Distance-to-fault measurements can greatly assist this task. However, transmission and receive bands for some carriers are constrained relative to a desired bandwidth for performing the distance-to-fault measurement. Further, PIM signals produced by the two tone signals may not take full advantage of the bandwidth allotted. For example, the United States 850 MHz cellular band (GSM-850) has a transmission band (downlink) of approximately Tx=869-894 MHz, and a receive band (uplink) of approximately Rx=824-849 MHz. A two tone test with an unmodulated tone Tx1=869 MHz and a modulated tone Tx2=889 MHz to 894 MHz problematically can only produce an in-band IM3 response Rx=844 MHz to 849 MHz (i.e., $\Delta F=5$ MHz). A bandwidth restricted to $\Delta F=5$ MHz can give a distance resolution of only 88 feet. A distance resolution of 88 feet is typically not useful for determining the location of a fault. For example, where a transmission line is 200 feet long from a base up to an antenna, and where there are multiple PIM sources creating PIM in the transmission line, the distance-to-fault display may appear as a single broad sweep of noise, with the source(s) of PIM being irresolvable so that the distance-to-PIM does not significantly improve the response time for locating the source(s).

Higher order responses (e.g., $5^{th}$ order harmonic, $7^{th}$ order harmonic, and 9th order harmonic) are typically not used in PIM measurement due to the reduced amplitudes of the signals as well as their unknown response as compared with the IM3 response. For example, a typical $5^{th}$ order (IM5) response to an industry standard, two tone test at 20 watts per tone can have an amplitude as much as 30 dB below the IM3 response. Embodiments of systems and methods in accordance with present invention can take advantage of shifts in frequencies between harmonics using modified test settings to improve a distance resolution in a PIM distance-to-fault measurement. Such embodiments can be useful, for example, in improving distance resolution in cellular bands having constrained transmission and/or receive bands.

Figure 3:
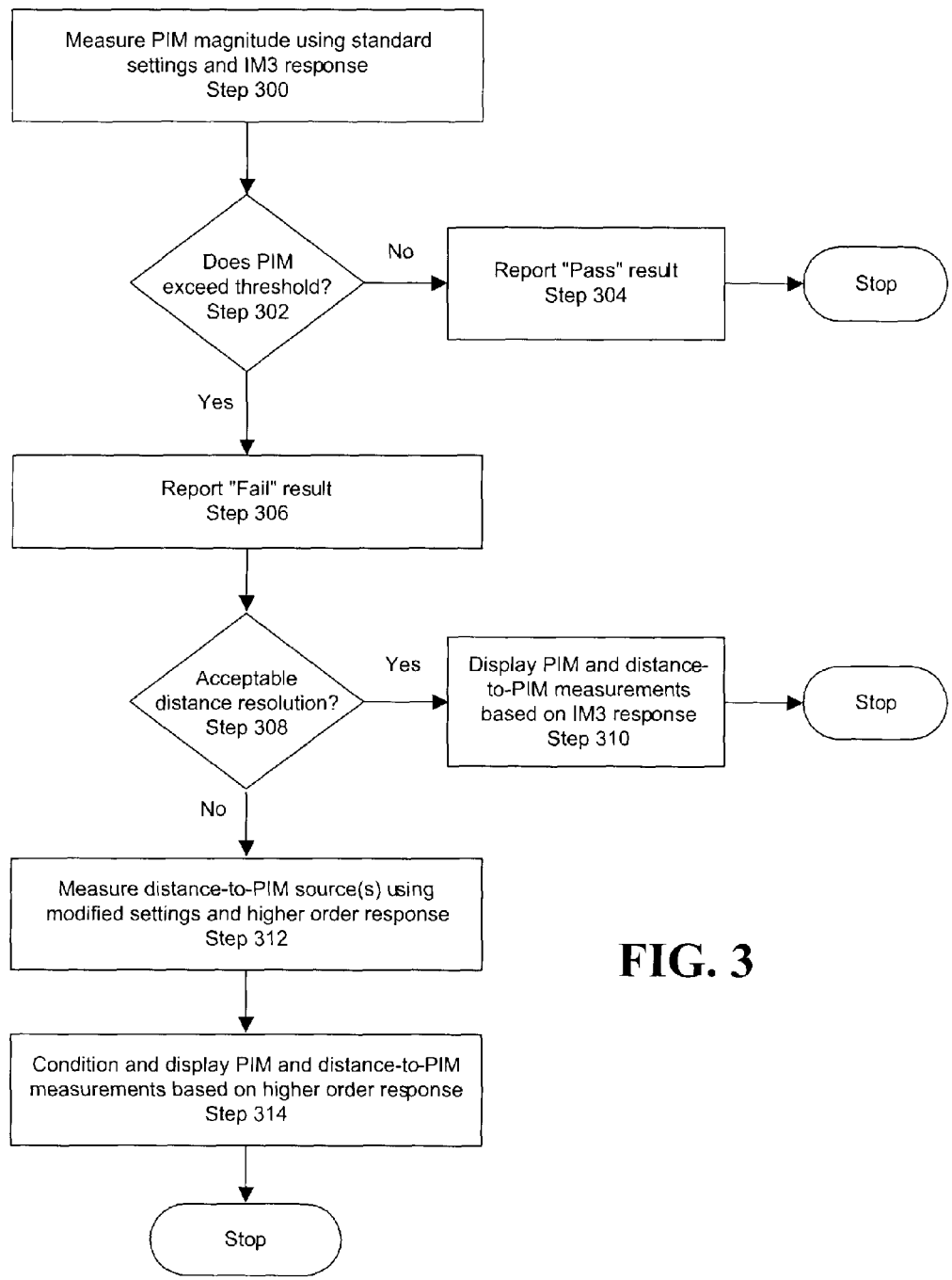
FIG. 3 is a flowchart of an embodiment of a method for measuring a distance to one or more PIM sources in accordance with the present invention.

FIG. 3 is a flowchart of an embodiment of a method of measuring a distance to a PIM source in accordance with the present invention. The method includes a two-part process to identify the presence of unacceptably large PIM and to determine the distance to the source(s) of the PIM from a test port. The method can be used, for example, with the exemplary PIM measurement device 100 of FIG. 1. Typically, a technician uses a PIM measurement device to test a site for PIM. The first part of the two-part process includes the technician (or other site tester) measuring a PIM magnitude in order to determine whether a problematic PIM exists in a cable run up to and past an antenna, for example (Step 300). The PIM magnitude measurement is a pass/fail test with a threshold typically indicated by the manufacturer of the connectors, cable, antenna and any devices in the cable run up to the antenna. The test can include a standard two tone, 20 Watt per tone test with a magnitude of an IM3 signal generated by a PIM source being the determinative result for whether an unacceptably high PIM exists (Step 302). If PIM is not measured by the test, or if the PIM measurement is acceptably low, such as below some threshold level, the PIM measurement device will report a "pass" result to the technician (Step 304).

If PIM is measured by the test and is above the threshold level, the PIM measurement device will report a "fail" result to the technician (Step 306). The PIM measurement device can then perform a distance-to-fault measurement to determine the distance from a test port of the PIM measurement device to one or more PIM sources. The distance-to-fault measurement can be performed automatically by the PIM measurement device upon a "fail" result of the initial PIM test, or alternatively, the distance-to-fault measurement can require initiation by the technician. The PIM measurement device can perform the distance-to-fault test using standard settings or modified settings. If there is sufficient bandwidth in the IM3 response and the distance resolution is acceptable (Step 308), for example where a receive band of the carriers being tested is sufficiently wide and the range of IM3 response falls within the receive band, the PIM measurement device can perform a distance-to-fault measurement with the standard 20 Watts per tone test while determining a distance from the test port of the PIM measurement device to one or more PIM sources using the IM3 response. The results can be displayed to the technician as a PIM magnitude and distance-to-PIM plot (Step 310).

However, where the receive band of the carriers being tested is constrained and/or where the range of IM3 response falls partially or completely outside of the receive band such that the distance resolution is unacceptable, and where a higher order response falls within the receive band, the PIM measurement device can perform, in accordance with an embodiment of the method, a distance-to-fault measurement using two test tones at a power higher than the standard 20 Watts per tone (Step 312). In an embodiment, the PIM measurement device can perform a distance-to-fault measurement using two test tones at 40 Watts per tone. As mentioned above, higher order responses have reduced amplitudes. The increased power of 40 Watts boosts the amplitude of the higher order responses, allowing the PIM measurement instrument to increase the signal-to-noise ratio of the higher order responses and obtain distance information from them. For the 850 MHz cellular band described above having a transmission band of approximately Tx=869-894 MHz, and a receive band of approximately Rx=824-849 MHz, a two tone test with an unmodulated tone Tx1=869 MHz and a modulated tone Tx2=889 MHz to 894 MHz both at 40 Watts each can produce an in-band IM5 response Rx=824 MHz to 849 MHz (i.e., $\Delta F=25$ MHz). The IM5 response includes the entire range of the receive band, taking advantage of the entire 25 MHz band to provide a distance resolution of 17.7 feet. While a distance resolution of 10 feet is preferred, the IM5 distance resolution of 17.7 feet is significantly improved over the IM3 distance resolution of 88 feet, and is sufficient to resolve a fault in a 30 to 200 foot cable run up to and past an antenna.

Once the distance-to-fault measurement is complete the data can be conditioned for display in a distance-to-PIM plot for the technicians review (Step 314). Optionally, the PIM amplitudes of the IM5 response can be scaled to substantially match the PIM amplitude of the IM3 response obtained in the first part of the two-part process, so that the use of the IM5 response and modified settings by the PIM measurement instrument is transparent to the technician. This can help avoid confusion in the field and allows a technician already trained for measuring distance-to-fault to perform the test without any additional training.

PIM measurement instruments currently in use for performing distance-to-fault measurements are capable of producing 50 Watts of power, although 20 Watts is the industry standard for testing. Thus, embodiments of the present invention can be implemented in many PIM measurement instruments already in use. Such PIM measurement instruments can have software modified to perform methods in accordance with the present invention. In some embodiments, the present invention includes a PIM measurement instrument which includes or can access a storage medium or computer readable medium (media) having instructions stored thereon/in which can be used to program a computer of the PIM measurement instrument to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalence.

The invention claimed is:

1. A method of determining a distance to a source of passive intermodulation (PIM) in a radio frequency (RF) transmit/receive system, comprising:
   generating a first signal with a first frequency in a transmit band of a RF transmit/receive system, the first signal being generated at a first power;
   generating a second signal with a second, swept frequency in the transmit band of the RF transmit/receive system, the second signal being generated at the first power;
   wherein the first frequency and the second frequency are chosen so that the source of PIM within the RF transmit/receive system will generate a third order harmonic signal having a swept frequency that falls at least partially within a receive band of the RF transmit/receive system;
   obtaining the third order harmonic signal in the receive band of the RF transmit/receive system;
   determining whether the third order harmonic signal has a magnitude that exceeds a noise threshold; and
   performing the following when the magnitude of the third order harmonic signal exceeds the noise threshold:
      generating a third signal with a third frequency in the transmit band of the RF transmit/receive system, the third signal being generated at a second power higher than the first power,
      generating a fourth signal with a fourth, swept frequency in the transmit band of the RF transmit/receive system, the fourth signal being generated at the second power,
      wherein the third frequency and the fourth frequency are chosen so that the source of PIM within the RF transmit/receive system will generate a harmonic signal of a higher order than the third order harmonic signal having a swept frequency that falls at least partially within the receive band of the RF transmit/receive system,
      obtaining the higher order harmonic signal in the receive band of the RF transmit/receive system, and
      calculating PIM magnitude and a distance to the source of PIM using the higher order harmonic signal.

2. The method of claim 1, further comprising:
   scaling the PIM magnitude calculated using the higher order harmonic signal and displaying the PIM magnitude and distance to the source of PIM in a distance-to-PIM plot.

3. The method of claim 1, wherein the higher order harmonic signal is a fifth order harmonic signal.

4. The method of claim 1, wherein the first power is 20 watts and wherein the second power is 40 watts.

5. The method of claim 1, further comprising:
   reporting a "pass" result when the magnitude of the third order harmonic signal does not exceed the noise threshold; and
   reporting a "fail" result when the magnitude of the fifth order harmonic exceeds the noise threshold.

6. A non-transitory computer readable storage medium, including instructions stored thereon which when read and executed by one or more computers cause the one or more computers to perform the steps comprising:
   generating a first signal with a first frequency in a transmit band of a RF transmit/receive system, the first signal being generated at a first power;
   generating a second signal with a second, swept frequency in the transmit band of the RF transmit/receive system, the second signal being generated at the first power;
   wherein the first frequency and the second frequency are chosen so that the source of PIM within the RF transmit/receive system will generate a third order harmonic signal having a swept frequency that falls at least partially within a receive band of the RF transmit/receive system;
   obtaining the third order harmonic signal in the receive band of the RF transmit/receive system;
   determining whether the third order harmonic signal has a magnitude that exceeds a noise threshold;
   performing the following when the magnitude of the third order harmonic signal exceeds the noise threshold:
      generating a third signal with a third frequency in the transmit band of the RF transmit/receive system, the third signal being generated at a second power higher than the first power,
      generating a fourth signal with a fourth, swept frequency in the transmit band of the RF transmit/receive system, the fourth signal being generated at the second power,
      wherein the third frequency and the fourth frequency are chosen so that the source of PIM within the RF transmit/receive system will generate a harmonic signal of a higher order than the third order harmonic signal having a swept frequency that falls at least partially within the receive band of the RF transmit/receive system,
      obtaining the higher order harmonic signal in the receive band of the RF transmit/receive system, and
      calculating PIM magnitude and a distance to the source of PIM using the higher order harmonic signal.

7. The non-transitory computer readable storage medium of claim 6, further including instructions stored thereon which when read and executed by one or more computers cause the one or more computers to perform the steps further comprising:

determining whether a bandwidth of the third order harmonic signal provides acceptable distance resolution when the magnitude of the third order harmonic signal exceeds the noise threshold; and calculating a distance to the source of PIM using the third order harmonic signal when the magnitude of the third order harmonic signal exceeds the noise threshold and the bandwidth of the third order harmonic signal provides acceptable distance resolution.

8. The non-transitory computer readable storage medium of claim 6, further including instructions stored thereon which when read and executed by one or more computers cause the one or more computers to perform the steps further comprising:

displaying the PIM magnitude and distance to the source of PIM in a distance-to-PIM plot; and wherein when the distance to the source of PIM is calculated using the higher order harmonic signal, the PIM magnitude in the distance-to-PIM plot is scaled to substantially match the magnitude of the third order harmonic signal.

9. The non-transitory computer readable storage medium of claim 6, further including instructions stored thereon which when read and executed by one or more computers cause the one or more computers to perform the steps further comprising:

reporting a "pass" result when the magnitude of the third order harmonic signal does not exceed the noise threshold; and reporting a "fail" result when the magnitude of the fifth order harmonic exceeds the noise threshold.

10. A method of determining a distance to a source of passive intermodulation (PIM) in a radio frequency (RF) transmit/receive system, comprising:

generating a first signal with a first frequency in a transmit band of a RF transmit/receive system, the first signal being generated at a first power;

generating a second signal with a second, swept frequency in the transmit band of the RF transmit/receive system, the second signal being generated at the first power;

wherein the first frequency and the second frequency are chosen so that the source of PIM within the RF transmit/receive system will generate a third order harmonic signal having a swept frequency that falls at least partially within a receive band of the RF transmit/receive system;

obtaining the third order harmonic signal in the receive band of the RF transmit/receive system;

determining whether the third order harmonic signal has a magnitude that exceeds a noise threshold;

determining whether a bandwidth of the third order harmonic signal provides acceptable distance resolution when the magnitude of the third order harmonic signal exceeds the noise threshold; and calculating a distance to the source of PIM using the third order harmonic signal when the magnitude of the third order harmonic signal exceeds the noise threshold and the bandwidth of the third order harmonic signal provides acceptable distance resolution;

performing the following when the magnitude of the third order harmonic signal exceeds the noise threshold and the bandwidth of the third order harmonic signal does not provide acceptable resolution:

generating a third signal with a third frequency in the transmit band of the RF transmit/receive system, the third signal being generated at a second power higher than the first power, generating a fourth signal with a fourth, swept frequency in the transmit band of the RF transmit/receive system, the fourth signal being generated at the second power, wherein the third frequency and the fourth frequency are chosen so that the source of PIM within the RF transmit/receive system will generate a harmonic signal of a higher order than the third order harmonic signal having a swept frequency that falls at least partially within the receive band of the RF transmit/receive system, obtaining the higher order harmonic signal in the receive band of the RF transmit/receive system, and calculating PIM magnitude and a distance to the source of PIM using the higher order harmonic signal.

11. The method of claim 10, further comprising:

displaying the PIM magnitude and distance to the source of PIM in a distance-to-PIM plot; and wherein when the distance to the source of PIM is calculated using the higher order harmonic signal, the PIM magnitude in the distance-to-PIM plot is scaled to substantially match the magnitude of the third order harmonic signal.

12. The method of claim 10, wherein the higher order harmonic signal is a fifth order harmonic signal.

13. The method of claim 10, wherein the first power is 20 watts and wherein the second power is 40 watts.

14. The method of claim 10, further comprising:

reporting a "pass" result when the magnitude of the third order harmonic signal does not exceed the noise threshold; and reporting a "fail" result when the magnitude of the fifth order harmonic exceeds the noise threshold.

* * * * *